US011259148B2

(12) United States Patent
Kim et al.

(10) Patent No.: US 11,259,148 B2
(45) Date of Patent: Feb. 22, 2022

(54) METHOD FOR RECEIVING MBMS SERVICE BY TERMINAL AND DEVICE SUPPORTING SAME

(71) Applicant: LG ELECTRONICS INC., Seoul (KR)

(72) Inventors: Sangwon Kim, Seoul (KR); Youngdae Lee, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 37 days.

(21) Appl. No.: 16/315,931

(22) PCT Filed: Jul. 7, 2017

(86) PCT No.: PCT/KR2017/007296
§ 371 (c)(1),
(2) Date: Jan. 7, 2019

(87) PCT Pub. No.: WO2018/012811
PCT Pub. Date: Jan. 18, 2018

(65) Prior Publication Data
US 2019/0306667 A1 Oct. 3, 2019

Related U.S. Application Data

(60) Provisional application No. 62/360,931, filed on Jul. 11, 2016, provisional application No. 62/360,466, filed on Jul. 10, 2016.

(51) Int. Cl.
*H04L 12/00* (2006.01)
*H04W 4/06* (2009.01)
(Continued)

(52) U.S. Cl.
CPC ............ *H04W 4/06* (2013.01); *H04B 17/318* (2015.01); *H04L 5/0051* (2013.01); *H04W 8/08* (2013.01);
(Continued)

(58) Field of Classification Search
None
See application file for complete search history.

(56) References Cited

U.S. PATENT DOCUMENTS

2011/0034177 A1* 2/2011 Oh .................... H04W 72/0453
455/450
2012/0182921 A1* 7/2012 Tsuboi .................. H04W 4/021
370/312
(Continued)

FOREIGN PATENT DOCUMENTS

EP 3001744 A1 * 3/2016 .......... H04W 72/005
EP 3001744 A1 3/2016
(Continued)

*Primary Examiner* — Noel R Beharry
*Assistant Examiner* — Lionel Preval
(74) *Attorney, Agent, or Firm* — Dentons US LLP

(57) ABSTRACT

Disclosed are a method for receiving an MBMS service and a device supporting same. According to an embodiment of the present invention, a method for receiving an MBMS service by a terminal in a wireless communication system comprises the steps of: deciding a coverage enhancement (CE) level of a terminal; receiving CE level information of an MBMS service of interest; comparing the decided CE level of the terminal and the received CE level information of the MBMS service and thus determining whether or not the MBMS service can be received by means of MBSFN transmission or SC-PTM transmission; and receiving the MBMS service on the basis of the determination result.

11 Claims, 10 Drawing Sheets

(51) Int. Cl.

| | |
|---|---|
| *H04B 17/318* | (2015.01) |
| *H04W 76/25* | (2018.01) |
| *H04W 76/27* | (2018.01) |
| *H04L 5/00* | (2006.01) |
| *H04W 8/08* | (2009.01) |
| *H04W 24/10* | (2009.01) |
| *H04W 80/02* | (2009.01) |
| *H04W 88/10* | (2009.01) |
| *H04W 28/02* | (2009.01) |

(52) U.S. Cl.
CPC ........... *H04W 24/10* (2013.01); *H04W 28/02* (2013.01); *H04W 76/25* (2018.02); *H04W 76/27* (2018.02); *H04W 80/02* (2013.01); *H04W 88/10* (2013.01)

(56) References Cited

U.S. PATENT DOCUMENTS

| | | |
|---|---|---|
| 2015/0043445 A1 | 2/2015 | Xiong et al. |
| 2017/0353946 A1* | 12/2017 | Rico Alvarino ...... H04W 24/08 |
| 2018/0035405 A1* | 2/2018 | Fujishiro ............. H04L 12/1881 |
| 2018/0352454 A1* | 12/2018 | Trank ........................ H04L 1/00 |
| 2019/0123923 A1* | 4/2019 | Belleschi ............... H04L 1/1671 |
| 2020/0053516 A1* | 2/2020 | Sui .................... H04W 72/0453 |

FOREIGN PATENT DOCUMENTS

| | | |
|---|---|---|
| WO | 2014/182105 A1 | 11/2014 |
| WO | 2015/057028 A1 | 4/2015 |
| WO | 2015/116732 A1 | 8/2015 |

\* cited by examiner

METHOD FOR RECEIVING MBMS SERVICE BY TERMINAL AND DEVICE SUPPORTING SAME

CROSS-REFERENCE TO RELATED APPLICATIONS

This application is the National Stage filing under 35 U.S.C. 371 of International Application No. PCT/KR2017/007296, filed on Jul. 7, 2017, which claims the benefit of U.S. Provisional Applications No. 62/360,466 filed on Jul. 10, 2016, and No. 62/360,931 filed on Jul. 11, 2016, the contents of which are all hereby incorporated by reference herein in their entirety.

BACKGROUND OF THE INVENTION

Field of the Invention

The present invention relates to a technique in which a user equipment (UE) receives a multimedia broadcast multicast service (MBMS) service provided by a base station.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas. In recent years, there is an ongoing discussion on 3GPP LTE-advanced (LTE-A) that is an evolution of the 3GPP LTE.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a UE as an upper-level requirement.

The 3GPP LTE can provide a multimedia broadcast multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

Meanwhile, in E-UTRAN, the MBMS service may be provided to the via MBSFN transmission or SC-TPM transmission. The UE may select a reception method according to a channel state for receiving the MBMS service. Recently, there is ongoing discussion on a method in which the UE effectively receives the MBMS service according to the channel state.

SUMMARY OF THE INVENTION

In E-UTRAN, an MBMS service may be provided to a UE via SC-PTM transmission as well as MBMSN transmission. However, when the UE receives an MBMS service of interest, it may not be most effective to receive the service via the MBSFN transmission or the SC-PTM transmission. This is because, for example, reception efficiency of the MBMS service varies depending on a data transmission environment. Therefore, there is a need for a technique in which the UE receives the MBMS service most efficiently according to such a condition.

According to an embodiment of the present invention, there is provided a method of receiving a multimedia broadcast multicast service (MBMS) service by a user equipment (UE) in a wireless communication system. The method includes: determining a coverage enhancement (CE) level of the UE; receiving CE level information of an MBMS service of interest; deciding whether the MBMS service can be received via MBSFN transmission or SC-PTM transmission, by comparing the determined CE level of the UE and the received CE level information of the MBMS service; and receiving the MBMS service on the basis of the decision result.

If the CE level of the UE is lower than the CE level information of the MBSM service, in the deciding, it may be decided that the MBMS service can be received via the MBSFM transmission or the SC-PTM transmission.

If the CE level of the UE is higher than the CE level information of the MBMS service, in the deciding, it may be decided that the MBMS service cannot be received via the MBSFN transmission or the SC-PTM transmission, and the method may further include requesting, by the UE, a network to transmit the MBSM service.

In the receiving, the MBMS service may be received from the network via unicast transmission.

The CE level of the UE may be determined based on reference signal received power (RSRP) measured in the UE.

The CE level information of the MBMS service may be provided for each MBMS service, temporary mobile group identity (TMGI), MBSFN area, or group-radio network temporary identifier (G-RNTI).

The CE level information of the MBMS service may be transmitted via a multicast control channel (MCCH) or single cell (SC)-MCCH channel.

According to another embodiment of the present invention, there is provided a method of receiving an MBMS service by a user equipment (UE) in a wireless communication system.

The method includes: predicting a prepetition transmission count of the UE; receiving a repetition transmission count corresponding to an MBMS service of interest; deciding whether the MBMS service can be received via MBSFN transmission or SC-PTM transmission, by comparing the predicted repetition transmission count of the UE and the received repetition transmission count of the MBMS service; and receiving the MBMS service according to the decision result.

If the repetition transmission count of the UE is greater than the repetition transmission count of the MBMS service, in the receiving, the MBMS service may be received via the MBSFN transmission or the SC-PTM transmission.

If the repetition transmission count of the UE is less than the repetition transmission count of the MBMS service, the method may further include requesting, by the UE, a network to transmit the MBMS service.

In the receiving, the MBMS service may be received from the network via unicast transmission.

The repetition transmission count of the UE may be determined based on RSRP measured in the UE.

The repetition transmission count of the MBMS service may be provided for each MBMS service, TMGI, MBSFN area, or G-RNTI.

The repetition transmission count of the MBMS service may be transmitted via an MCCH or SC-MCCH channel.

According to another embodiment of the present invention, there is provided a user equipment (UE) for receiving an MBMS service in a wireless communication system. The UE includes: a memory; a transceiver; and a processor coupling the memory and the transceiver. The processor may be configured to: determine a CE level of the UE; receive CE level information of an MBMS service of interest; decide whether the MBMS service can be received via MBSFN transmission or SC-PTM transmission, by comparing the determined CE level of the UE and the received CE level information of the MBMS service; and receive the MBMS service on the basis of the decision result.

According to embodiments of the present invention, a UE decides whether to receive an MBMS service via MBSFN transmission or SC-PTM transmission on the basis of a CE level and/or a transmission repetition count, and thus the UE can effectively receive the MBMS service.

DESCRIPTION OF EXEMPLARY
EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
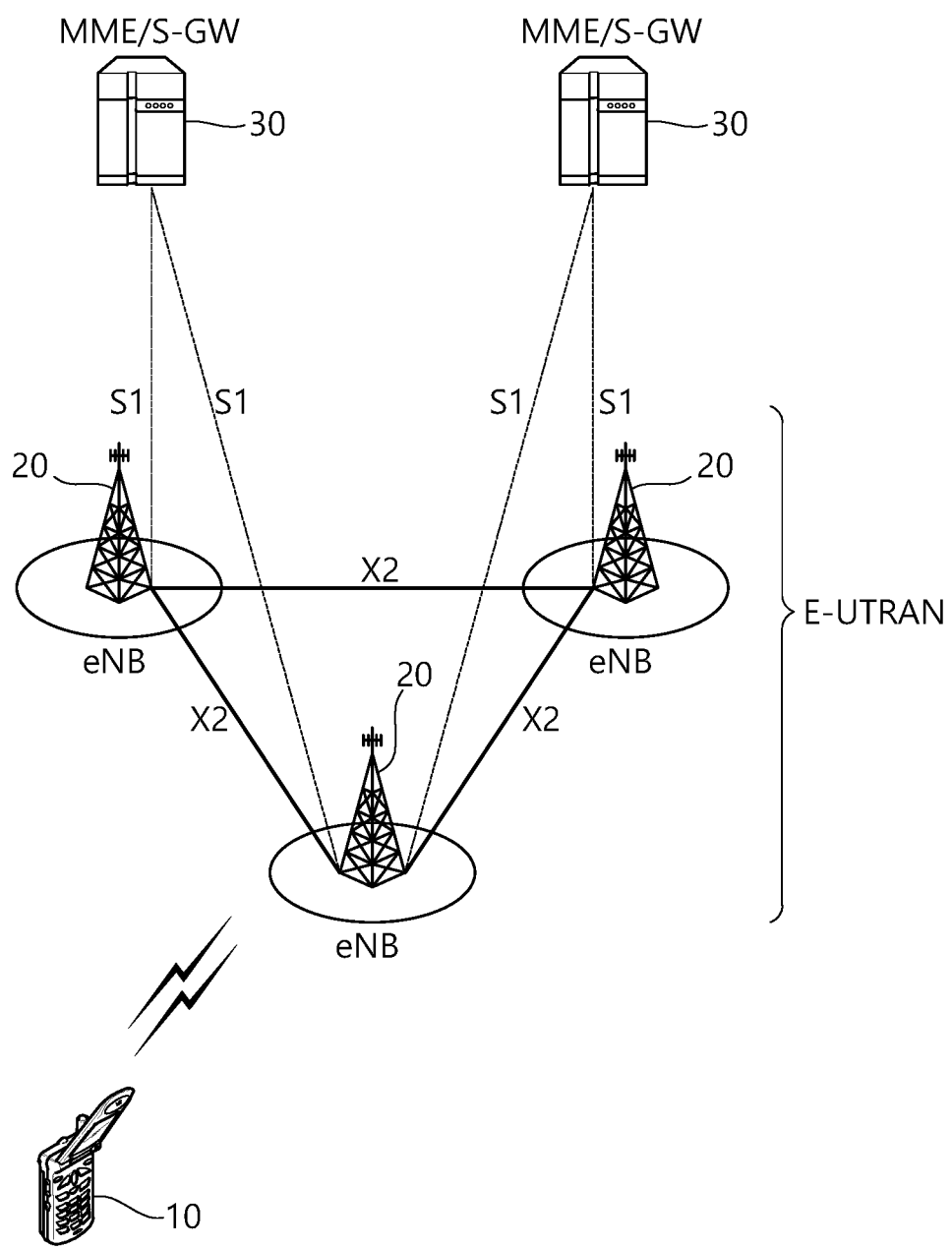
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a serving gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
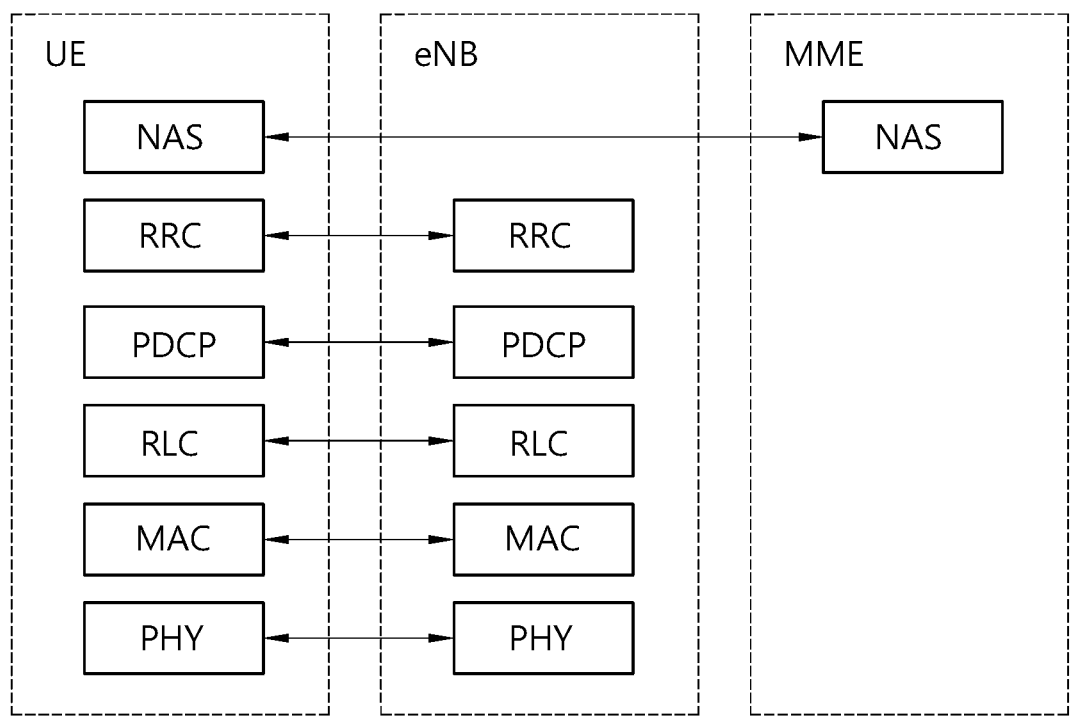
FIG. 2 shows a block diagram of a control plane protocol stack of an LTE system.
Figure 3:
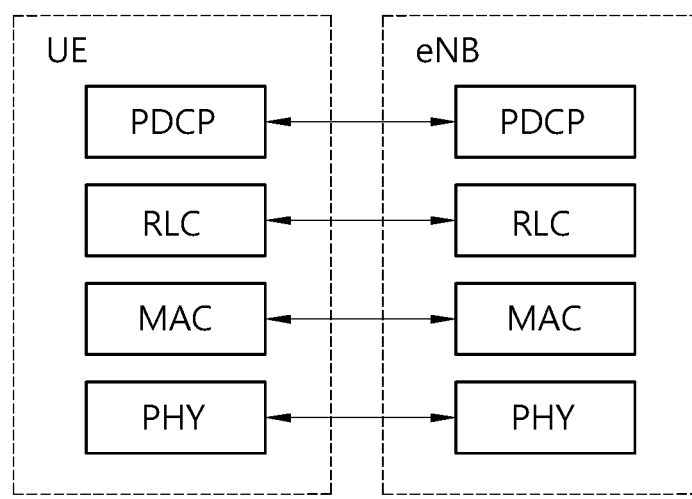
FIG. 3 shows a block diagram of a user plane protocol stack of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, RRC state of UE and RRC connection method is described below.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

A non-access stratum (NAS) layer belongs to an upper layer of the RRC layer and serves to perform session management, mobility management, or the like.

In order to manage the mobility of the UE in the NAS layer positioned on the control planes of the UE and the MME, an EPS mobility management (EMM) registered state and an EMM deregistered state may be defined. The EMM registered state and the EMM deregistered state may be applied to the UE and the MME. Like a case of turning on the power of the UE for the first time, an initial UE is in the EMM deregistered state and the UE performs a process of registering the UE in the corresponding network through an initial attach procedure in order to access the network. When the attach procedure is successfully performed, the UE and the MME is transitioned to the EMM registered state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, a mobility of the UE is managed by the command of the network. If a location of the UE in the ECM-IDLE state becomes different from a location known to the network, the UE announces the location of the UE to the network through a tracking area update procedure.

Figure 4:
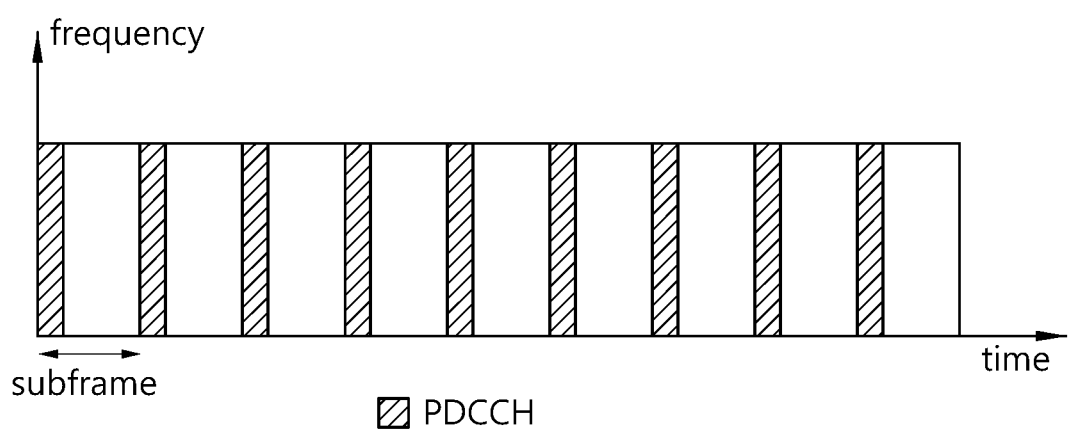
FIG. 4 shows an example of a physical channel structure.

FIG. 4 shows an example of a physical channel structure.

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The multicast control channel (MCCH) is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Multimedia broadcast multicast services (MBMS) are described.

Figure 5:
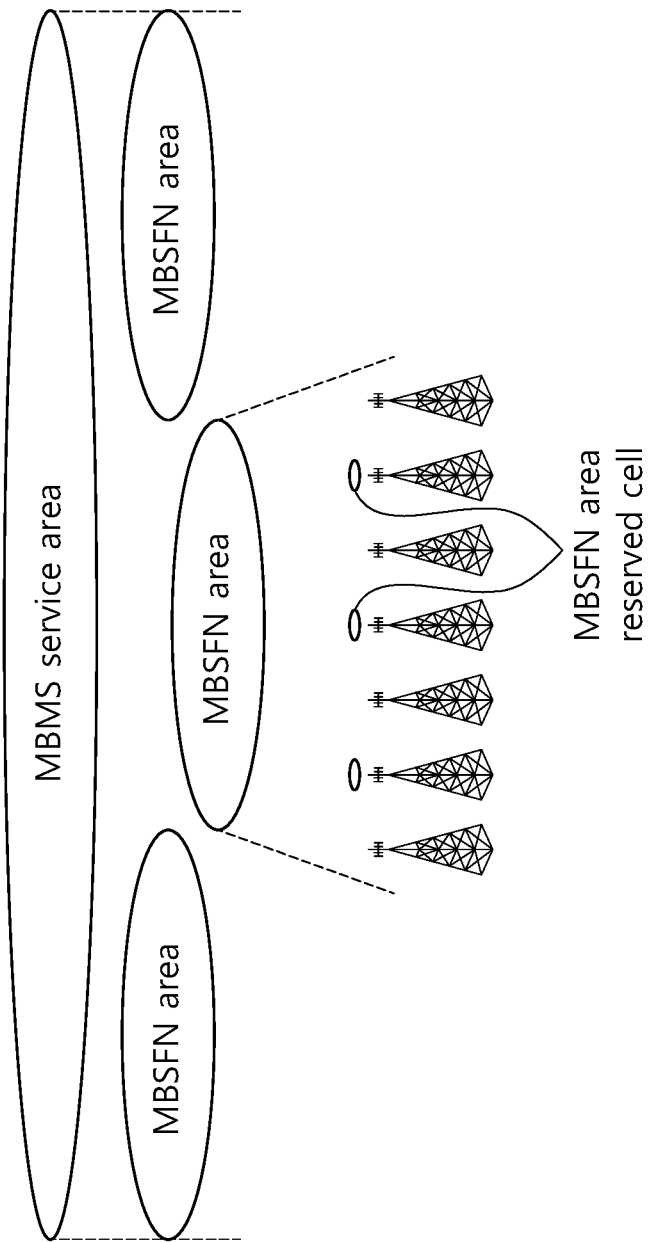
FIG. 5 shows MBMS definitions. For MBMS, the following definitions may be introduced.

FIG. 5 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

Transmission of a MBMS in E-UTRAN uses either MBSFN transmission or SC-PTM transmission. The MCE makes the decision on whether to use SC-PTM or MBSFN for each MBMS session.

Single-cell transmission of MBMS is characterized by:

MBMS is transmitted in the coverage of a single cell;

One single cell (SC)-MCCH and one or more SC-MTCH(s) are mapped on DL-SCH;

Scheduling is done by the eNB;

SC-MCCH and SC-MTCH transmissions are each indicated by a logical channel specific RNTI on PDCCH (there is a one-to-one mapping between temporary mobile group identity (TMGI) and group-radio network temporary identifier (G-RNTI) used for the reception of the DL-SCH to which a SC-MTCH is mapped);

A single transmission is used for DL-SCH (i.e. neither blind HARQ repetitions nor RLC quick repeat) on which SC-MCCH or SC-MTCH is mapped;

SC-MCCH and SC-MTCH use the RLC-UM mode.

For each SC-MTCH, the following scheduling information is provided on SC-MCCH:

SC-MTCH scheduling cycle;

SC-MTCH on-duration: duration in downlink subframes that the UE waits for, after waking up from DRX, to receive PDCCHs. If the UE successfully decodes a PDCCH indicating the DL-SCH to which this SC-MTCH is mapped, the UE stays awake and starts the inactivity timer;

SC-MTCH inactivity-timer: duration in downlink subframes that the UE waits to successfully decode a PDCCH, from the last successful decoding of a PDCCH indicating the DL-SCH to which this SC-MTCH is mapped, failing which it re-enters DRX. The UE shall restart the inactivity timer following a single successful decoding of a PDCCH.

Meanwhile, the SC-PTM reception opportunities are independent of the unicast DRX scheme.

NOTE 2: The SC-MTCH inactivity-timer may be set to 0.

NOTE 3: Although the above parameters are per SC-MTCH (i.e. per MBMS service), the network may configure the same scheduling pattern for multiple SC-MTCHs (i.e. multiple MBMS services).

Multi-cell transmission of MBMS is characterized by:
Synchronous transmission of MBMS within its MBSFN Area;
Combining of MBMS transmission from multiple cells is supported;
Scheduling of each MCH is done by the MCE;
A single transmission is used for MCH (i.e. neither blind HARQ repetitions nor RLC quick repeat);
A single Transport Block is used per TTI for MCH transmission, that TB uses all the MBSFN resources in that subframe;

MTCH and MCCH can be multiplexed on the same MCH and are mapped on MCH for p-t-m transmission;
MTCH and MCCH use the RLC-UM mode;
The MAC subheader indicates the LCID for MTCH and MCCH;
The MBSFN Synchronization Area, the MBSFN Area, and the MBSFN cells are semi-statically configured e.g. by O&M;

The UE is not required to receive services from more than one MBSFN Area simultaneously and may support only a limited number of MTCHs.

Hereinafter, single-cell point-to-multipoint (SC-PTM) transmission is described.

A transmission method of an MBMS service includes SCPTM transmission and multimedia broadcast multicast service single frequency network (MBSFN) transmission. While identifiable signals are transmitted simultaneously in a plurality of cells in case of the MBSFN transmission, the MBMS service is transmitted in a single cell in case of the SCPTM transmission. Therefore, unlike in the MBSFN transmission, synchronization between cells is not necessary in the SCPTM transmission. Further, the SCPTM transmission directly uses the existing PDSCH, and thus has a unicast feature unlike in the MBSFN transmission. That is, a plurality of UEs read the same PDCCH, and acquire an RNTI for each service to receive an SCPTM service. An SCPTM-dedicated MCCH is introduced, and if it is decided that a service desired by the UE is an SCPTM service via the MCCH, the UE may acquire a corresponding RNTI value and read a PDCCH through a corresponding RNTI to receive the SCPTM service.

Meanwhile, SIB13 includes information required to acquire MBMS control information associated with one or more MBSFN areas. Table 1 shows an element included in the SIB13.

TABLE 1

```
-- ASN1START
SystemInformationBlockType13-r9 ::=    SEQUENCE {
    mbsfn-AreaInfoList-r9                  MBSFN-AreaInfoList-r9,
    notificationConfig-r9                  MBMS-NotificationConfig-r9,
    lateNonCriticalExtension               OCTET STRING    OPTIONAL,
    ...
}
-- ASN1STOP
```

In Table 1, notificationConfig denotes an MBMS notification associated with a configuration parameter. The UE may ignore this field if dl-Bandwidth included in MasterinformationBlock is set to n6.

In addition, MBSFN-AreaInfoList includes information required to acquire MBMS control information associated with one or more MBSFN areas. Table 2 shows an element included in MBSFN-AreaInfoList.

TABLE 2

```
-- ASN1START
MBSFN-AreaInfoList-r9 ::=    SEQUENCE (SIZE(1..maxMBSFN-Area)) OF MBSFN-AreaInfo-r9
MBSFN-AreaInfo-r9 ::=        SEQUENCE {
    mbsfn-AreaId-r9              MBSFN-AreaId-r12,
    non-MBSFNregionLength        ENUMERATED (s1, s2},
    notificationIndicator-r9          INTEGER (0..7),
    mcch-Config-r9               SEQUENCE {
        mcch-RepetitionPeriod-r9     ENUMERATED {rf32, rf64, rf128, rf256},
        mcch-Offset-r9               INTEGER (0..10),
        mcch-ModificationPeriod-r9   ENUMERATED {rf512, rf1024},
        sf-AllocInfo-r9              BIT STRING (SIZE(6}),
        signallingMCS-r9             ENUMERATED {n2, n7, n13, n19)
    },
    ...
}
-- ASN1STOP
```

MBSFN areas are static, unless changed by O&M (i.e. no dynamic change of areas);

In Table 2, signallingMCS denotes an MCS applicable to each (P)MCH configured for an MBSFN area and a subframe indicated by an sf-AllocInfo field, with respect to a first subframe allocated to the (P)MCH within each MCH scheduling period. The MCH scheduling period includes MCH scheduling information provided by MAC.

Figure 6:
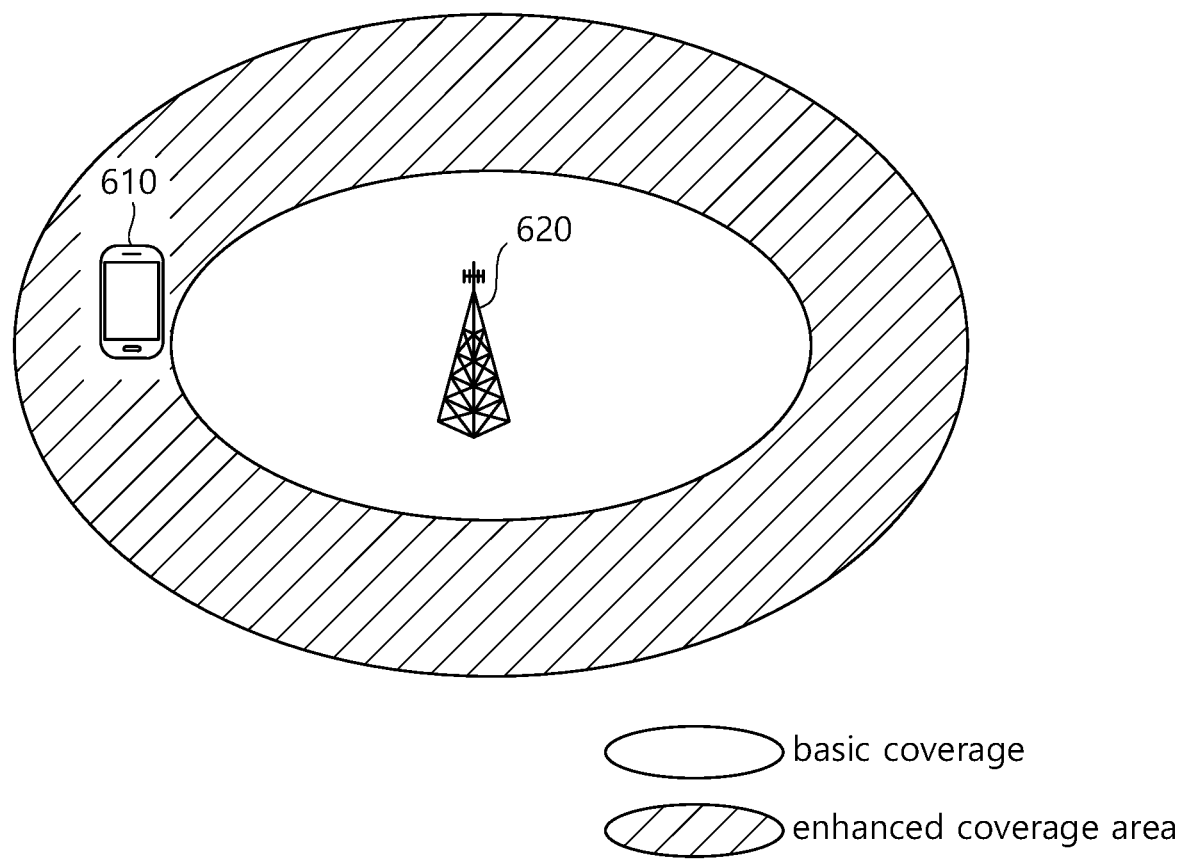
FIG. 6 shows an example of cell coverage enhancement.

FIG. 6 shows an example of cell coverage enhancement.

Recently, there is ongoing discussion on various coverage enhancement schemes such as a repetitive transmission method for a UE 610 for each channel/signal. A coverage enhancement level (hereinafter, a CE level) may vary depending on a UE location in a cell and signal quality of the UE in the cell. A difference of the CE level implies that a repetition count (resource, subframe) required for successful uplink transmission and downlink reception is different. From a UE perspective, in terms of power consumption, it is preferable to reside in a cell which requires a fewer repetition for successful uplink transmission and downlink reception. The fewer reception for successful uplink transmission and downlink reception may be more necessary, in particular, for an MTC UE. The MTC UE indicates a wireless device providing MTC communication. The MTC communication indicates information exchange between MTC UEs via a BS without human interaction or information exchange between the MTC UE and the MTC service via the BS. From a network perspective, it is also preferable to serve a UE requiring a fewer repetition.

It is assumed in the present invention that a plurality of CE levels are present for a measurement including a level corresponding to a case where there is no coverage enhancement. According to the CE level, it is assumed that a repetition count required for successful uplink transmission and downlink reception is different. The repetition count may be an amount of resources required for successful uplink transmission and downlink reception, and may be the number of subframes required for successful uplink transmission and downlink reception. A CE level 0 corresponds to the case where there is no coverage enhancement. The repetition count, resource amount, or the number of subframes required for successful uplink transmission and downlink reception may increase in proportion to an increase in the CE level.

The UE may determine the CE level for transmission/reception in a specific cell through the following method, and each threshold may be provided by a serving cell.

(1) RSRP/RSRQ-based CE level determination: The UE may determine a CE level of a cell by comparing a measured RSRP/RSRQ result and a predetermined threshold.

A network may set an RSRP/RSRQ threshold for one or more CE levels in order for the UE to determine the CE level in a specific cell. For example, the network may signal a $0^{th}$ RSRP/RSRQ threshold for identifying a CE level 0 and a CE level 1, a $1^{st}$ RSRP/RSRQ threshold for identifying the CE level 1 and a CE level 2, and a $2^{nd}$ RSRP/RSRQ threshold for identifying the CE level 2 and a CE level 3. The level 0 implies that there is no coverage enhancement for the measurement.

While measuring a serving cell and a neighboring cell, the UE may determine the CE level by comparing a threshold determined by a network and an RSRP/RSRQ result measured by the UE. If the measurement result is lower than the $0^{th}$ RSRP/RSRQ threshold, the UE may determine the CE level to 0. If the measurement result is lower than the $1^{st}$ RSRP/RSRQ threshold and higher than the $0^{th}$ RSRP/RSRQ threshold, the UE may determine the CE level to 1. If the measurement result is lower than the $2^{nd}$ RSRP/RSRQ threshold and higher than the $1^{st}$ RSRP/RSRQ threshold, the UE may determine the CE level to 2. Likewise, if the measurement result is higher than the $2^{nd}$ RSRP/RSRQ threshold, the UE may determine the CE level to 3.

(2) PSS (Primary Synchronization Signal)/SSS(Secondary Synchronization Signal)-based CE level determination: The UE may determine a CE level of a cell by comparing a time for acquiring PSS/SSS and a predetermined threshold.

A network may set a time threshold for one or more CE levels in order for the UE to determine the CE level in a specific cell. For example, the network may signal a $0^{th}$ time threshold for identifying a CE level 0 and a CE level 1, a $1^{st}$ time threshold for identifying the CE level 1 and a CE level 2, and a $2^{nd}$ time threshold for identifying the CE level 2 and a CE level 3. The level 0 implies that there is no coverage enhancement for the measurement.

While measuring a serving cell and a neighboring cell, the UE may determine the CE level by comparing a time threshold determined by a network and a time for acquiring PSS/SSS. If the time for acquiring the PSS/SSS is shorter than the time $0^{th}$ threshold, the UE may determine the CE level to 0. If the time for acquiring the PSS/SSS is longer than the $1^{st}$ time threshold and shorter than the $0^{th}$ time threshold, the UE may determine the CE level to 1. If the time for acquiring the PSS/SSS is longer than the $2^{nd}$ time threshold and shorter than the $1^{st}$ time threshold, the UE may determine the CE level to 2. Likewise, if the time for acquiring the PSS/SSS is longer than the $2^{nd}$ time threshold, the UE may determine the CE level to 3.

(3) Downlink message-based CE level determination: The UE may determine a CE level of a cell by comparing a predetermined threshold and a repetition count required to successfully receive a certain downlink message.

(4) Uplink message-based CE level determination: The UE may determine a CE level of a cell by comparing a predetermined threshold and a repetition count required to successfully transmit a certain uplink message.

Although it is assumed in the present description that the CE level can be set to 0 to 3, this merely means that one or more levels can be set, and the present invention is not limited thereto.

Meanwhile, according to the conventional technique, since an MCCH change period is very long, dynamic link adaptation cannot be applied to MBSFN transmission. A technique of increasing wireless efficiency by dynamically changing an MCS level of MBSFN transmission is proposed in the present embodiment.

According to an embodiment of the present invention, a UE which is interested in receiving an MBMS service via MBSFN transmission or SC-PTM transmission may decide whether the MBMS service can be received via the MBSFN transmission or the SC-PTM transmission on the basis of a CE level of the MBMS service and a CE level of the UE.

Figure 7:
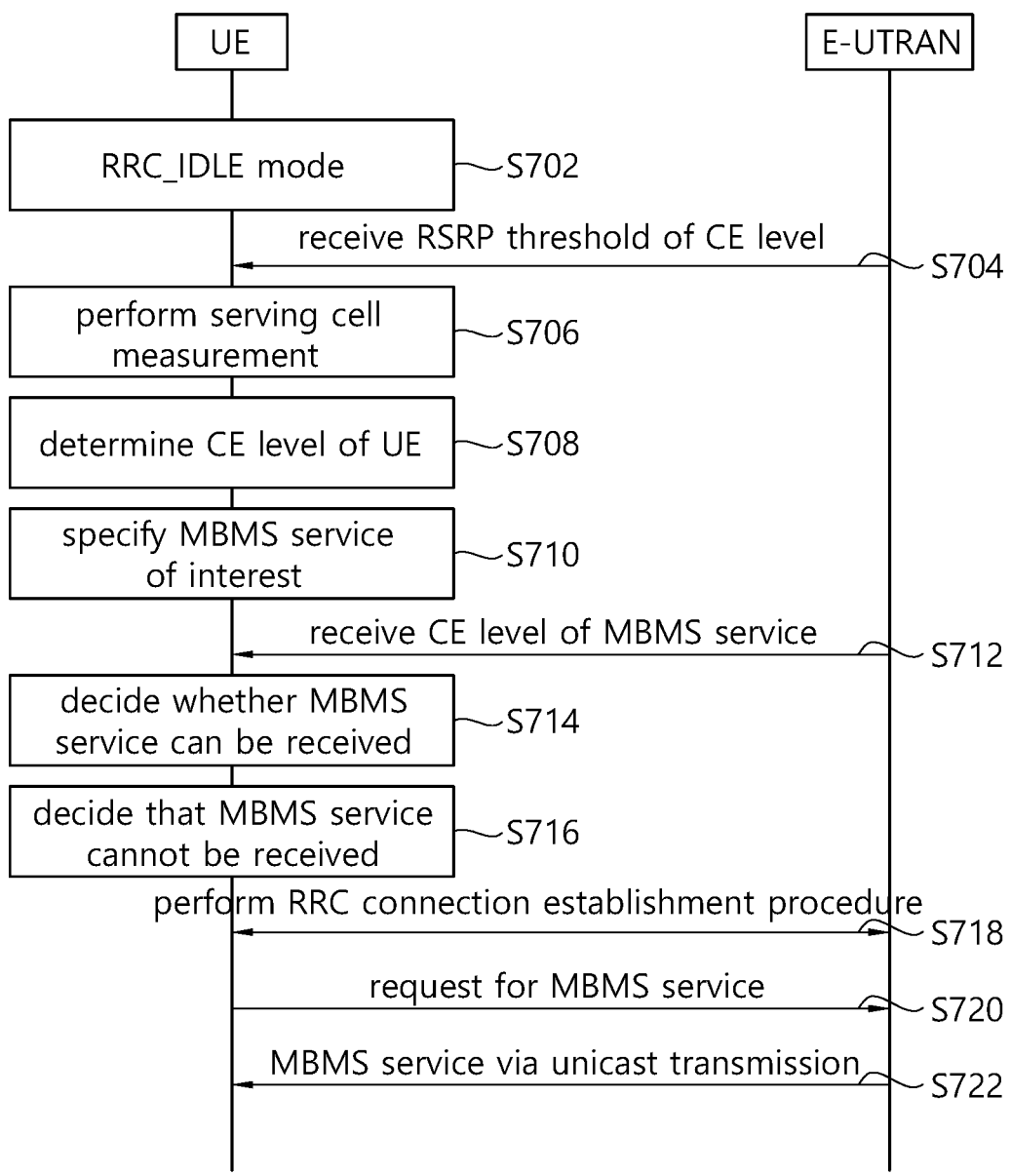
FIG. 7 is a flowchart for explaining a method of receiving an MBMS service according to an embodiment of the present invention.

FIG. 7 is a flowchart for explaining a method of receiving an MBMS service according to an embodiment of the present invention. The present embodiment may be performed by a UE located in enhanced coverage of a cell.

First, the UE may enter an RRC_IDLE state (S702). However, the UE entering the RRC_IDLE state is only for explaining a condition of establishing an RRC connection to be described below, and it does not mean that the embodiment of the present invention is applied only to the UE in the RRC_IDLE mode.

The UE may receive an RSRP threshold from a network (S704). The RSRP threshold may be set by the network, and each threshold provides a reference value for determining a CE level.

The UE may perform a measurement on the network (S706). By measuring a serving cell, the UE may acquire a measured RSRP or a RSRQ result.

The UE may determine a CE level of the UE (S708). The CE level of the UE may be an index indicating a UE location in a cell and signal quality of the UE in the cell. According to an embodiment, the UE may determine the CE level of the cell by comparing a measured RSRP result and a predetermined RSRP threshold.

According to an embodiment, if an RSRP threshold of a CE level 3 is set in an RRC layer and if the measured RSRP is less than the RSRP threshold of the set CE level, the UE may regard the CE level of the UE as a level 3.

Otherwise, if an RSRP threshold of a CE level 2 is set in the RRC level and if the measured RSRP is less than the RSRP threshold of the set CE level 2, the UE may regard the CE level of the UE as a level 2.

In addition, otherwise, if a measured RSRP is less than an RSRP threshold of a CE level 1 set in the RRC layer, the UE may regard the CE level of the UE as a level 1.

If not corresponding to all of the aforementioned cases, the UE regards the CE level of the UE as a level 0.

The UE may specify an MBMS service of interest (S710).

The UE may receive CE level information of the MBMS service of interest (S712). Specifically, the UE may receive MBMS CE level information corresponding to the MBMS service of interest. The CE level information of the MBMS service is an index indicating quality of a cell for providing the MBMS service, and may be determined by a network. The CE level information of the MBMS service may be provided for each MBMS service, TMGI, MBSFN area, or G-RNTI. For example, the CE level information of the MBMS service may be provided on an MBMS service basis. In addition, the UE may transmit the CE level information of the MBMS service via an MCCH or SC-MCCH channel. Meanwhile, the CE level information of the MBMS service may include a repetition transmission count corresponding to the MBMS service. In this case, the UE may predict its repetition transmission count. As described below, the UE may decide whether the UE will receive the MBMS service via MBSFN transmission or SC-PTM transmission on the basis of the repetition transmission count.

The UE may decide whether the MBMS service can be received (S714). The UE may decide whether the MBMS service can be received via the MBSFN transmission/SC-PTM transmission, by comparing the determined CE level and the received CE level information of the MBMS service. If the CE level information corresponding to the MBMS service is lower than the determined CE level of the UE, for example, if the CE level of the MBMS service is 1 and the CE level of the UE is 3, the UE may decide that the MBMS service cannot be received via the MBSFN transmission or the SC-PTM transmission. In addition, if the CE level information corresponding to the MBMS service is higher than the CE level of the UE, for example, if the CE level of the MBMS service is 3 and the CE level of the UE is 1, the UE may decide that the MBMS service can be received via the MBSFN transmission or the SC-PTM transmission.

If the UE decides that the MBMS service cannot be received via the MBSFN transmission or the SC-PTM transmission (S716), unicast transmission of the MBMS service may be requested. As such, the UE may request for transmission of the MBMS service in a unicast manner even if the MBMS service cannot be received via the MBSFM transmission or the SC-PTM transmission.

Specifically, if the UE in the RRC_IDLE state decides that the MBMS service cannot be received via the MBSFN transmission or the SC-PTM transmission, unicast transmission of the MBMS service may be requested by starting an RRC connection establishment procedure (S718). In addition, if the UE in the RRC_CONNECTED state decides that the MBMS service cannot be received via the MBSFN transmission or the SC-PTM transmission, an AS layer of the UE reports this to a NAS layer and requests the network to provide the MBMS service (S720). As such, the UE may receive the MBMS service of interest via unicast transmission (S722).

If it is decided that the MBMS service can be received via the MBSFN transmission or the SC-PTM transmission, the UE starts to receive the MBMS service via the MBSFN transmission or the SC-PTM transmission.

By using a method of receiving an MBMS service according to another embodiment of the present invention, a UE may decide whether the MBMS service can be received via MBSFN transmission/SC-PTM transmission on the basis of a repetition transmission count of the UE and a repetition transmission count of the MBMS service, instead of s CE level of the UE and a CE level of the MBMS service.

The UE may receive a threshold from a network. The threshold may be set by the network, and each threshold provides a reference value for determining, by the UE, the repetition transmission count. Hereinafter, the threshold may be called an RSRP threshold.

The UE may perform a measurement on the network. Accordingly, the UE may acquire a measured RSRP or a RSRQ result.

Specifically, the UE may predict the repetition transmission count of the UE. The repetition transmission count of the UE indicates a repetition count required for successful uplink transmission and downlink reception of the UE. The repetition transmission count may be predicted based on a measured RSRP and an RSRP threshold.

According to an embodiment, if an RSRP threshold of a repetition count A configured by an RRC layer is determined and if a measured RSRP is less than the RSRP threshold of the repetition count A, the UE regards that a required repetition count of the UE is # A.

Otherwise, if an RSRP threshold of a repetition count B configured by an RRC layer is determined and if a measured RSRP is less than the RSRP threshold of the repetition count B, the UE regards that a required repetition count of the UE is # B.

In addition, otherwise, if the measured RSRP is less than a RSRP threshold of a repetition count C configured by the RRC layer, the UE regards that the required repetition count is # C.

If not corresponding to all of the aforementioned cases, the UE regards that the required repetition transmission count is # D.

Meanwhile, in the present embodiment, the repetition count # A may be a greatest value, and # D may be a small value in an alphabetical order.

The UE may receive a repetition transmission count corresponding to an MBMS service. The repetition transmission count of the MBMS service indicates a repetition count required for successful uplink transmission and downlink reception of the MBMS service. Specifically, the repetition transmission count of the MBMS service may be provided for each MBSM service, TMGI, MBSFN area, or G-RNTI. For example, the repetition transmission count of the MBMS service may be provided on an MBMS service basis. In addition, the UE may transmit the repetition transmission count of the MBMS service via an MCCH or SC-MCCH channel.

The UE may decide whether the MBMS service can be received via MBSFN transmission/SC-PTM transmission, by comparing the repetition transmission count of the UE and the received repetition transmission count of the MBMS service. If the repetition transmission count corresponding to the MBMS service is less than the repetition transmission count required in the UE, for example, if the repetition transmission count of the MBMS service is 100 and the repetition transmission count of the UE is 200, the UE decides that the MBMS service cannot be received via the MBSFN transmission or the SC-PTM transmission. In addition, if the repetition transmission count corresponding to the MBMS service is greater than the repetition transmission count required in the UE, for example, since the repetition transmission count of the MBMS service is 200 and the repetition transmission count of the UE is 100, the UE decides that the MBMS service can be received via the MBSFN transmission or the SC-PTM transmission.

If the UE decides that the MBMS service cannot be received via the MBSFN transmission or the SC-PTM transmission, unicast transmission of the MBMS service may be requested. Specifically, if the UE in the RRC_IDLE state decides that the MBMS service cannot be received via the MBSFN transmission or the SC-PTM transmission, unicast transmission of the MBMS service may be requested by starting an RRC connection establishment procedure. In addition, if the UE in the RRC_CONNECTED state decides that the MBMS service cannot be received via the MBSFN transmission or the SC-PTM transmission, an AS layer of the UE reports this to a NAS layer and requests the network to provide the MBMS service. As such, the UE may receive the MBMS service of interest via unicast transmission.

If it is decided that the MBMS service can be received via the MBSFN transmission or the SC-PTM transmission, the UE starts to receive the MBMS service via the MBSFN transmission or the SC-PTM transmission.

Figure 8:
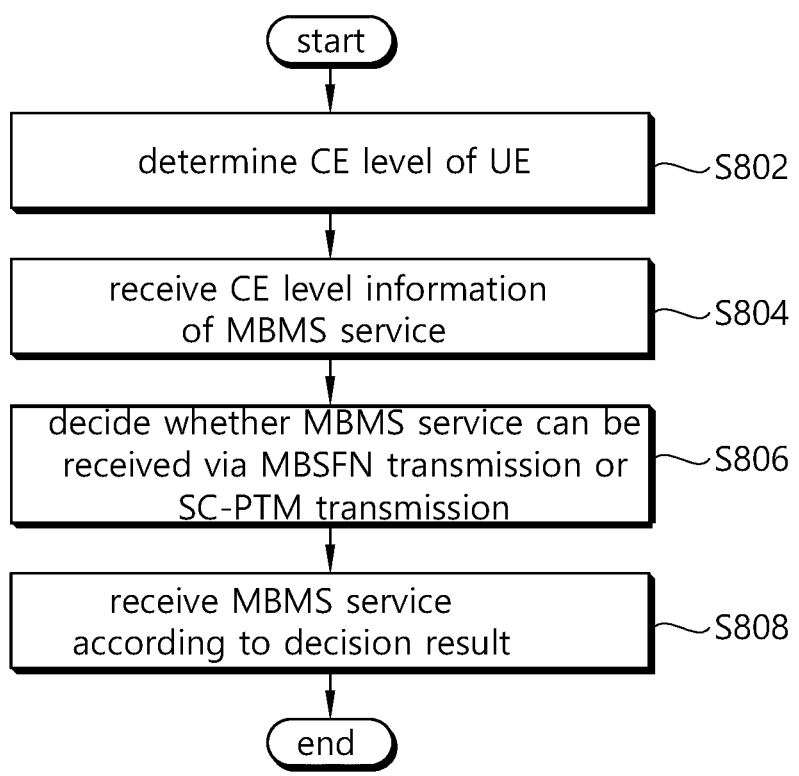
FIG. 8 is a flowchart for explaining a method of receiving an MBMS service according to an embodiment of the present invention.

FIG. 8 is a flowchart for explaining a method of receiving an MBMS service according to an embodiment of the present invention.

A UE may determine a CE level of the UE (S802). Specifically, the UE may determine the CE level of the cell on the basis of an RSRP threshold received from a network and a measured RSRP result. In an embodiment, if an RSRP threshold of a CE level 3 is set in an RRC layer and if the measured RSRP is less than the RSRP threshold of the set CE level, the UE may regard the CE level of the UE as a level 3.

The UE may receive CE level information of the MBMS service of interest (S804). The CE level information of the MBMS service is an index indicating quality of a cell for providing the MBMS service, and may be determined by a network. The CE level information of the MBMS service may be provided for each MBMS service, TMGI, MBSFN area, or G-RNTI. In addition, the CE level information of the MBMS service may be transmitted via an MCCH or SC-MCCH channel.

The UE may decide whether the MBMS service can be received via the MBSFN transmission or the SC-PTM transmission, by comparing the determined CE level of the UE and the received CE level information of the MBMS service (S806). Specifically, if the CE level of the UE is lower than the CE level information of the MBSM service, the UE may determine that the MBMS service can be received via the MBSFM transmission or the SC-PTM transmission. In addition, if the CE level of the UE is higher than the CE level information of the MBMS service, the UE may determine that the MBMS service cannot be received via the MBSFN transmission or the SC-PTM transmission. In this case, the UE may request a network to transmit the MBMS service via unicast transmission. Thereafter, the UE may receive from the network the MBMS service via the unicast transmission.

Figure 9:
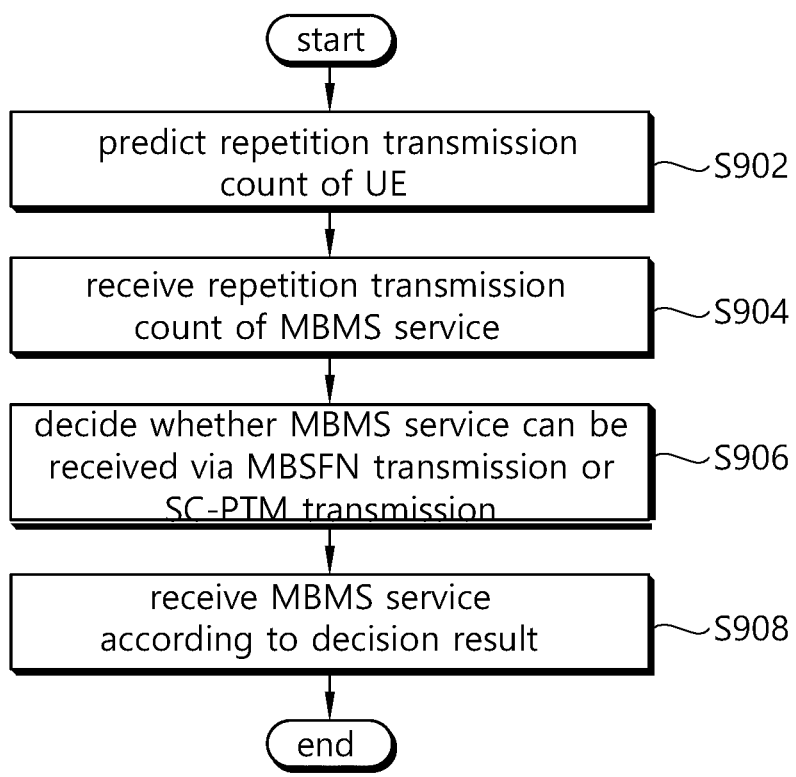
FIG. 9 is a flowchart for explaining a method of receiving an MBMS service according to an embodiment of the present invention.

FIG. 9 is a flowchart for explaining a method of receiving an MBMS service according to an embodiment of the present invention.

A UE may predict a repetition transmission count of the UE (S902). Specifically, the UE may receive a threshold from a network, and may perform a measurement on the network. Hereinafter, the threshold may be called an RSRP threshold. Thereafter, the UE may predict the repetition transmission count of the UE. The repetition transmission count of the UE indicates a repetition count required for successful uplink transmission and downlink reception of the UE. In other words, the repetition transmission count may be predicted based on a measured RSRP and an RSRP threshold.

The UE may receive a repetition transmission count corresponding to the MBMS service (S904). According to an embodiment, the repetition transmission count of the MBMS service may be provided for each MBSM service, TMGI, MBSFN area, or G-RNTI. For example, the repetition transmission count of the MBMS service may be provided on an MBMS service basis. In addition, the UE may transmit the repetition transmission count of the MBMS service via an MCCH or SC-MCCH channel.

The UE may decide whether the MBMS service can be received via MBSFN transmission or SC-PTM transmission, by comparing the predicted repetition transmission count of the UE and the received repetition transmission count of the MBMS service (S906). According to an embodiment, if the repetition transmission count corresponding to the MBMS service is less than the repetition transmission count required in the UE, the UE decides that the MBMS service cannot be received via the MBSFN transmission or the SC-PTM transmission. In addition, if the repetition transmission count corresponding to the MBMS service is greater than the repetition transmission count required in the UE, the UE decides that the MBMS service can be received via the MBSFN transmission or the SC-PTM transmission.

The UE may receive the MBMS service according to the decision result (S908). Specifically, if it is decided that the MBMS service can be received via the MBSFN transmission or the SC-PTM transmission, the UE starts to receive the MBMS service via the MBSFN transmission or the SC-PTM transmission. In addition, if it is decided that the MBMS service cannot be received via the MBSFN transmission or the SC-PTM transmission, the UE may request for unicast transmission of the MBMS service.

Figure 10:
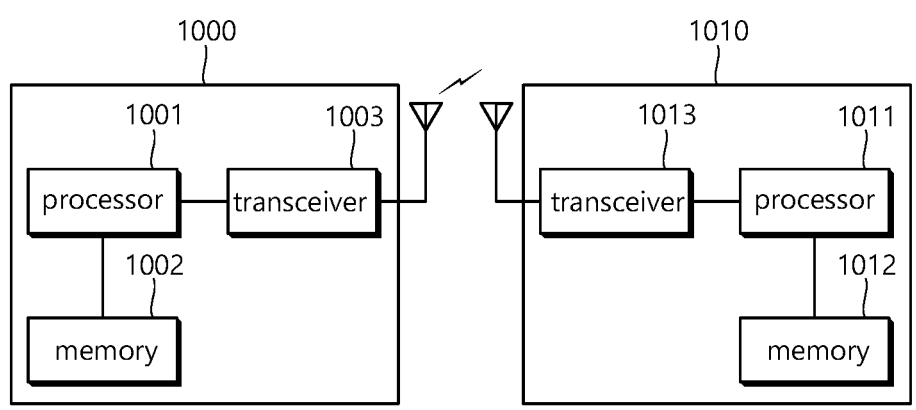
FIG. 10 is a block diagram illustrating a wireless apparatus in which an embodiment of the present invention can be implemented.

FIG. 10 is a block diagram illustrating a wireless apparatus in which an embodiment of the present invention can be implemented.

A BS 1000 includes a processor 1001, a memory 1002, and a transceiver 1003. The memory 1002 is coupled to the processor 1001, and stores a variety of information for driving the processor 1001. The transceiver 1003 is coupled to the processor 1001, and transmits and/or receives a radio signal. The processor 1001 implements the proposed functions, procedures, and/or methods. In the aforementioned embodiments, an operation of the BS may be implemented by the processor 1001.

A UE 1010 includes a processor 1011, a memory 1012, and a transceiver 1013. The memory 1012 is coupled to the processor 1011, and stores a variety of information for driving the processor 1011. The transceiver 1013 is coupled to the processor 1011, and transmits and/or receives a radio signal. The processor 61 implements the proposed functions, procedures, and/or methods. In the aforementioned embodiments, an operation of the UE 1010 may be implemented by the processor 1011.

The processors 1011 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of receiving a multimedia broadcast multicast service (MBMS) service by a user equipment (UE) in a wireless communication system, the method comprising:
   receiving, from a base station, first information related to at least one threshold;
   determining a first coverage enhancement (CE) level for the UE based on the at least one threshold and reference signal received power (RSRP) or reference signal received quality (RSRQ) that is measured based on reference signals from the base station;
   receiving, from a base station, second information related to a second CE level that supports multicast-broadcast single-frequency network (MBSFN) transmission or single-cell point-to-multipoint (SC-PTM) transmission of the MBMS service;
   based on the first CE level being lower than or equal to the second CE level, receiving data packets for the MBMS service, that are repeatedly transmitted based on the second CE level, via the MBSFN transmission or the SC-PTM transmission; and
   based on the first CE level being greater than the second CE level, transmitting a request to unicast the data packets of the MBMS service, and
   receiving the data packets via unicast transmission.

2. The method of claim 1, wherein the second information related to the second CE level is provided for each MBMS service, temporary mobile group identity (TMGI), MBSFN area, or group-radio network temporary identifier (G-RNTI).

3. The method of claim 1, wherein the second information related to the second CE level is received via a multicast control channel (MCCH) or single cell (SC)-MCCH channel.

4. The method of claim 1, further comprising:
   determining the first CE level by comparing the RSRP or the RSRQ and the at least one threshold.

5. The method of claim 1, further comprising:
   performing a procedure for radio resource control (RRC) connection establishment, before receiving the MBMS service via the unicast transmission.

6. A method of receiving a multimedia broadcast multicast service (MBMS) service by a user equipment (UE) in a wireless communication system, the method comprising:
   receiving, from a base station, first information related to at least one threshold;
   determining a first repetition transmission count for the UE based on the at least one threshold and reference signal received power (RSRP) or reference signal received quality (RSRQ) that is measured based on reference signals from the base station; and
   receiving, from a base station, second information related to a second repetition transmission count that supports multicast-broadcast single-frequency network (MBSFN) transmission or single-cell point-to-multipoint (SC-PTM) transmission of the MBMS service;
   based on the first repetition transmission count being lower than or equal to the second repetition transmission count, receiving data packets for the MBMS service, that are repeatedly transmitted based on the second repetition transmission count, via the MBSFN transmission or the SC-PTM transmission; and
   based on the first repetition transmission count being greater than the second repetition transmission count, transmitting a request to unicast the data packets of the MBMS service, and receiving the data packets via unicast transmission.

7. The method of claim 6, further comprising:
   performing a procedure for radio resource control (RRC) connection establishment, before receiving the MBMS service via the unicast transmission.

8. The method of claim 6, further comprising:
   determining the first repetition transmission count level by comparing the RSRP or the RSRQ and at least one threshold.

9. The method of claim 6, wherein the second information related to the second repetition transmission count is provided for each MBMS service, temporary mobile group identity (TMGI), MBSFN area, or group-radio network temporary identifier (G-RNTI).

10. The method of claim 6, wherein the second information related to the second repetition transmission count is received via a multicast control channel (MCCH) or single cell (SC)-MCCH channel.

11. A user equipment (UE) for receiving a multimedia broadcast multicast service (MBMS) service in a wireless communication system, the UE comprising:

a transceiver; and a processor operatively coupled to the transceiver and configured to:

receive, from a base station, first information related to at least one threshold;

determine a first coverage enhancement (CE) level for the UE based on the at least one threshold and reference signal received power (RSRP) or reference signal received quality (RSRQ) that is measured based on reference signals from the base station;

receive, from a base station, second information related to a second CE level that supports multicast-broadcast single-frequency network (MBSFN) transmission or single-cell point-to-multipoint (SC-PTM) transmission of the MBMS service;

based on the first CE level being lower than or equal to the second CE level, receive data packets for the MBMS service, that are repeatedly transmitted based on the second CE level via the MBSFN transmission or the SC-PTM transmission; and based on the first CE level being greater than the second CE level, transmit a request to unicast the data packets of the MBMS service, and receive the data packets via unicast transmission.

* * * * *